United States Patent
Wagner et al.

[11] Patent Number: 5,959,211
[45] Date of Patent: Sep. 28, 1999

[54] METHOD AND APPARATUS FOR POSITIONING SENSORS AGAINST A NON-PLANAR SURFACE

[75] Inventors: Richard Joseph Wagner, Williamston; Dimitar Filev, Novi; Francis Michael Migda, Commerce Township; Thomas Eric Pearson, Grosse Ile, all of Mich.

[73] Assignee: Ford Global Technologies, Inc., Dearborn, Mich.

[21] Appl. No.: 09/220,005

[22] Filed: Dec. 23, 1998

[51] Int. Cl.⁶ ..................................................... G01N 9/24
[52] U.S. Cl. .............................. 73/634; 73/866.5; 73/649
[58] Field of Search ............................. 73/866.5, 865.7, 73/104, 105, 150 R, 643, 644, 649, 625, 632, 633, 634; 33/501.04, 558.2; 324/230

[56] References Cited

U.S. PATENT DOCUMENTS

| | | |
|---|---|---|
| 2,266,620 | 12/1941 | Coffman . |
| 4,358,471 | 11/1982 | Derkacs et al. . |
| 4,364,663 | 12/1982 | Gardner et al. .......................... 356/371 |
| 4,437,468 | 3/1984 | Sorenson et al. ......................... 73/625 |
| 4,912,410 | 3/1990 | Morley .................................. 73/865.8 |
| 4,919,967 | 4/1990 | Handke et al. . |
| 5,006,799 | 4/1991 | Pfanstiehl . |
| 5,175,018 | 12/1992 | Lee et al. . |
| 5,493,904 | 2/1996 | Shih et al. . |
| 5,535,143 | 7/1996 | Face . |
| 5,709,905 | 1/1998 | Shaw et al. . |

FOREIGN PATENT DOCUMENTS

| | | |
|---|---|---|
| 57-91230 | 11/1980 | Japan . |
| 2195439 | 4/1987 | United Kingdom . |

*Primary Examiner*—Michael Brock
*Assistant Examiner*—Thuy Vinh Tran
*Attorney, Agent, or Firm*—Donald A. Wilkinson; Roger L. May

[57] ABSTRACT

Typically, paint film thickness is measured at a plurality of locations on a vehicle body by a hand-held sensor which is positioned by an operator at a position normal to the respective locations being sensed. This operation may be inaccurate and time-consuming because substantial reliance is placed upon the operator. The invention provides an apparatus for positioning a plurality of sensors in contact with a plurality of locations, respectively, on a non-planar surface such that each sensor is positioned normal to the non-planar surface at the respective location on the surface. The apparatus includes a movable fixture and a plurality of pistons carried by the movable fixture. Each of the pistons is movable independently with respect to the fixture. Each piston includes a distal end, and a sensor is pivotally mounted to each distal end. Each distal end is spring-biased away from the fixture, and each sensor includes at least two contact points for contacting the non-planar surface on opposing sides of the respective location for orienting the sensor in a position normal to the non-planar surface at the respective location.

8 Claims, 2 Drawing Sheets

METHOD AND APPARATUS FOR POSITIONING SENSORS AGAINST A NON-PLANAR SURFACE

TECHNICAL FIELD

The present invention relates to a method and apparatus for positioning multiple sensors against a non-planar surface for sensing surface conditions.

BACKGROUND ART

The application of paint to the body of a vehicle is a sensitive process. The quality, durability and color matching of the paint are critical in producing a high quality product, and therefore require significant quality control efforts.

Generally, paint film thickness is monitored by the use of hand-held thickness sensors, such as an ultrasonic pulse echo thickness meter, or a magnetic induction meter. These sensors are handled by an operator who must manually apply the sensor against the surface of the vehicle in a position normal to the surface at a plurality of locations on the surface. In the performance of this measurement, it is highly important that the operator position the sensor normal to the particular location being sensed, and it is also critical that the operator position the sensor consistently at the same plurality of locations on the surface being sensed. Errors in the angle of the sensor relative to the surface or in the location of the sensor on the surface can adversely effect quality control. Because a significant reliance is placed upon the operator, a significant amount of error is introduced in the quality control process.

Another problem with the use of a hand-held sensor is that the sensor must be sequentially moved from location to location on the product being inspected to obtain a complete set of measurements. This movement of the sensor from location to location can be very time consuming, and therefore expensive.

It is therefore desirable to provide a method and apparatus for accurately and repeatably positioning a sensor at a plurality of locations on a vehicle surface for measuring paint film thickness, or other surface characteristics, at the particular locations without requiring operator handling.

DISCLOSURE OF THE INVENTION

The present invention overcomes the above-referenced shortcomings of the prior art method of measuring paint thickness on a non-planar surface of a vehicle. The apparatus of the present invention includes a fixture carrying a plurality of independently movable pistons having pivotable sensors at the distal ends thereof. Accordingly, the position and pivotal angle of each sensor is independently adjustable to properly orient each sensor against the respective particular location to be sensed.

More specifically, the present invention relates to an apparatus for positioning a plurality of sensors in contact with a plurality of locations, respectively, on a non-planar surface such that each sensor is positioned normal to the non-planar surface at the respective location on the surface. The apparatus includes a movable fixture and a plurality of pistons carried by the movable fixture. Each of the pistons is independently movable with respect to the fixture, and each has a distal end. A plurality of sensors are pivotally connected, respectively, to the distal end of each piston. Each of the distal ends is spring-biased away from the fixture, and each sensor includes at least two contact points for contacting the non-planar surface on opposing sides of the respective location for orienting the sensor in a position normal to the non-planar surface at the respective location.

The present invention also contemplates a method of positioning a plurality of sensors in contact with a plurality of locations, respectively, on a non-planar surface such that each sensor is positioned normal to the non-planar surface at the respective location on the surface for measuring a surface characteristic, such as paint thickness. The method includes providing a movable fixture as described above including movable pistons and a pivotable sensor. The movable fixture is moved toward the non-planar surface to engage one of the contact points of the respective sensor with the non-planar surface. As movement of the fixture toward the non-planar surface continues, the contact with the non-planar surface causes pivotal rotation of the sensor to the position normal to the respective location. The sensor is then operated to measure paint thickness at the particular location.

Of course, the method and apparatus of the present invention can be used for sensing a variety of surface conditions, such as paint thickness, laminate thickness, primer thickness, surface reflectivity, or any other parameter requiring surface contact by the sensor.

Accordingly, an object of the invention is to provide a method and apparatus for positioning a plurality of sensors in contact with a plurality of locations, respectively, on a non-planar surface such that each sensor is positioned normal to the non-planar surface at the respective location on the surface, wherein operator handling of the sensor is not required.

The above object and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
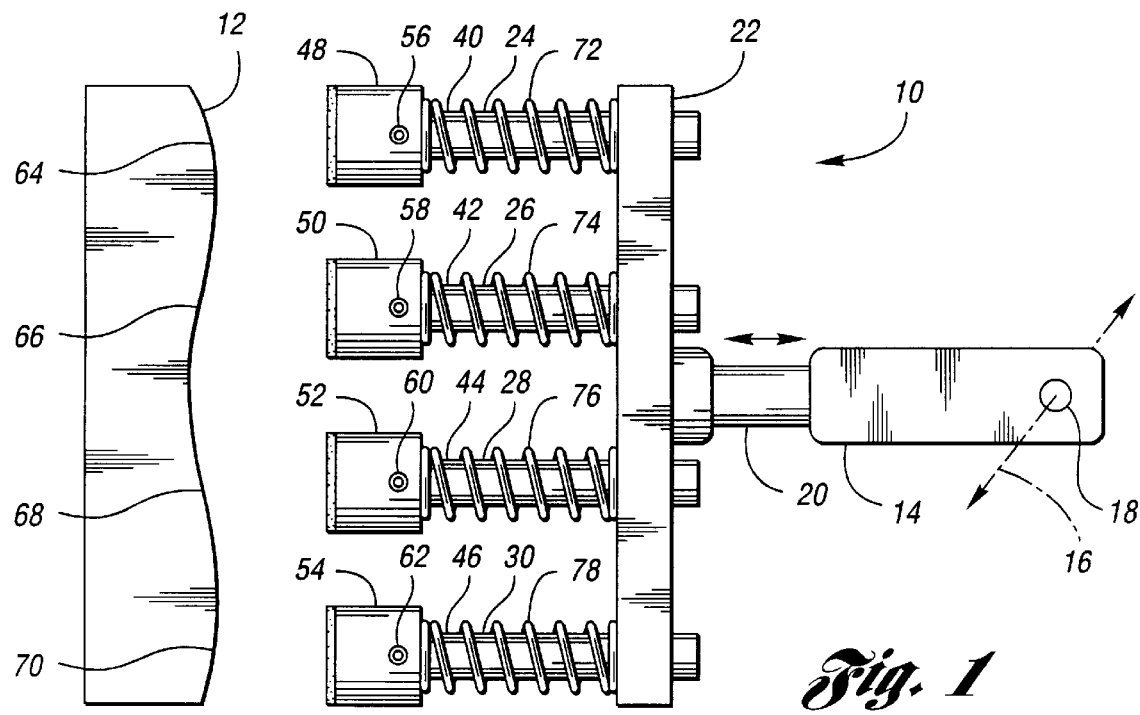
FIG. 1 shows a schematically arranged side view of a multiple sensor apparatus and a non-planar surface target in accordance with the present invention.
Figure 2:
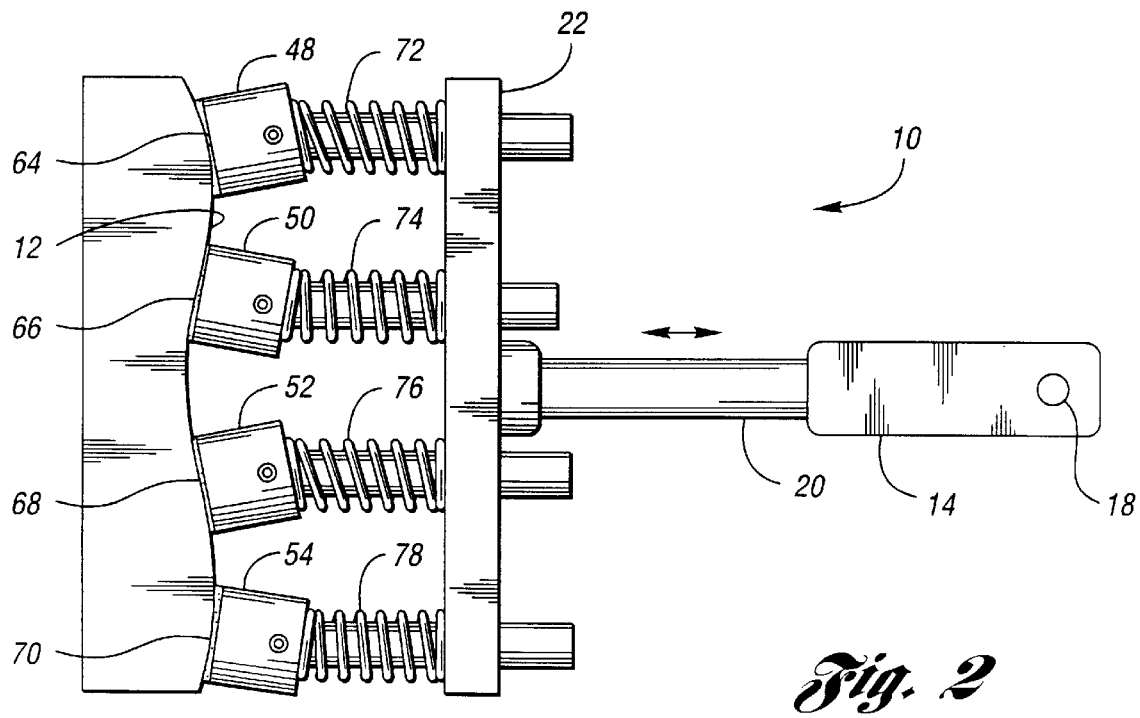
FIG. 2 shows a schematically arranged side view of the multiple sensor apparatus of FIG. 1 positioned in contact with the non-planar surface target.

Referring to FIGS. 1 and 2, a multiple sensor apparatus 10 is shown schematically in accordance with the present invention for inspecting a non-planar surface target 12. The apparatus 10 includes a support arm 14 which is pivotally moveable about the axis 16 at the pivot joint 18. The support arm 14 includes a movable extension 20 for moving the movable fixture 22. A plurality of pistons 24, 26, 28, 30 are carried in cylindrical apertures formed within the fixture 22. The pistons 24, 26, 28, 30 are linearly movable with respect to the fixture 22 within the cylindrical apertures 32, 34, 36, 38 (shown in FIG. 4).

Each piston 24, 26, 28, 30 includes a distal end 40, 42, 44, 46, and a sensor 48, 50, 52, 54 is pivotally mounted, respectively, to the respective distal ends 40, 42, 44, 46 at the respective pivot joint 56, 58, 60, 62.

The sensors 48, 50, 52, 54 are operative to measure paint thickness or other desired characteristics on the non-planar surface target 12 at the plurality of particular locations 64, 66, 68, 70.

Each distal end 40, 42, 44, 46 is spring-biased away from the fixture 22 by the respective spring 72, 74, 76, 78 (which may be mechanical, pneumatic, etc.). As shown in FIG. 2, as the fixture 22 is moved toward the non-planar surface 12, the sensors 48, 50, 52, 54 contact the non-planar surface 12, which causes pivotal movement of the sensors 48, 50, 52, 54, and compression of certain springs, such as springs 72,76 shown in FIG. 2, so that each sensor is positioned normal to the non-planar surface 12 at the respective particular location 64, 66, 68, 70.

Figure 3:
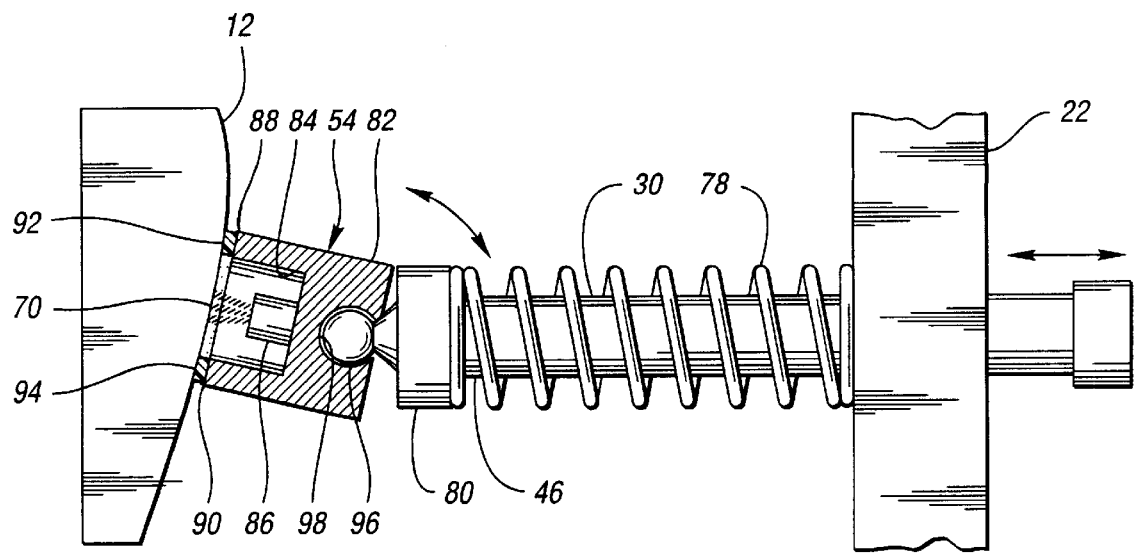
FIG. 3 shows a schematically arranged detailed side view corresponding with FIG. 2.

The sensor apparatus is shown in more detail in FIG. 3. As shown, the distal end 46 includes a hub 80 against which the spring 78 is engaged for biasing the distal end 46 away from the fixture 22. The sensor 54 includes a cylindrical sensor head 82 with a central opening 84 formed therein for receiving a sensing member 86. The sensor head 82 includes at least two contact points 88,90 for engagement against the non-planar surface 12. Preferably, multiple contact points are provided to properly orient the sensor 54 normal to the location 70 to be sensed. As shown in FIG. 3, the contact points 88,90 are provided with cushions 92,94 to prevent damage to the non-planar surface 12. Preferably, the sensor 86 is a paint film thickness sensor, but the sensor 86 could be any applicable surface sensor to measure any required parameter.

The sensor head 82 is attached by a ball 96 and a socket 98 to the distal end 46 of the piston 30. Of course, any known pivotal attachment would be sufficient (such as a universal joint, etc.).

Figure 4:
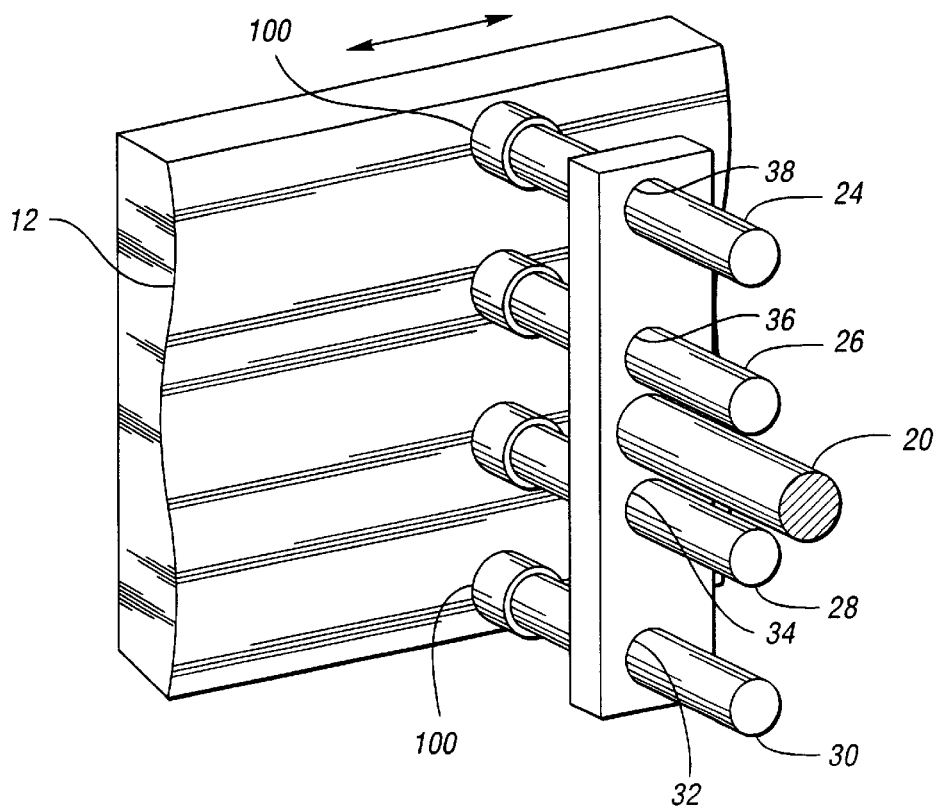
FIG. 4 shows a schematic rear perspective view of the multiple position sensor apparatus positioned against the non-planar surface target shown in FIG. 2.

Preferably, each sensor head 82 includes a circular rim 100, as shown in FIG. 4, which is padded for engagement with a non-planar surface 12 to properly align the sensor 86 normal to the particular location 70 being sensed.

The bias provided by the springs 72,74,76,78 maintains firm contact between the respective sensors 48,50,52,54 and the non-planar surface 12.

Of course, multiple sensor pistons may be attached to a single fixture as shown in FIG. 4, and such pistons need not be arranged linearly. The shape of the fixture 22 acts as a template to keep the sensors aligned. This mechanism provides a significant advantage over individual sensor placement by hand, especially when the arrangement of measurement locations is important for process control. Feed-back from each sensor may be transferred through umbilical lines back to a central processing unit located off-line.

In one embodiment, this invention will be used to sense dry paint film thickness to accurately determine the thickness of various target films on a vehicle body. Accurate determination of the film thickness is essential for enabling closed-loop control of the paint application process.

In the proposed process, a painted automobile body would enter a robotic inspection cell after curing of the paint film. The vehicle model and body style would be detected by the automation for optimal tooling placement. The body may either be moving or stationary during the inspection process. The robot or other hard/soft automation would detect the body entering the cell and position the inspection tooling (multiple sensor apparatus 10) relative to the body location to determine paint film build. The robot would track the position of the moving body while holding the tooling against the body in such a way as to have no relative movement between the tooling and the body.

As described above, the tooling is a pivoting system, which mechanically aligns the sensor heads normal to the complex curve of the automobile body surface immediately upon physical contact with the body surface. The sensor includes a cushion to eliminate any scratching of the paint. During the time period of measurement, the robot/automation will hold the sensors at a constant location on the body. A coupling liquid may be used on the vehicle surface to couple the sensors to the surface. Once measurement of film build are acquired at one set of locations, the robot will reposition the sensors at subsequent locations until all data collection is completed. In production it is likely that there will be three such systems installed per cell: one to collect data from the right side of the body, one for the left side, and one to handle the horizontal surfaces. Individual sensors within each fixture would be positioned in line with the paint applicators to provide the most useful data for process control.

Any type of contact sensor may be used with this invention. For example, within the sensor head could be a magnetic induction gauge, an ultrasound gauge or an optical reflectometry gauge. The invention could also be easily modified for sensors which make measurements other than the film thickness.

While the best mode for carrying out the invention has been described in detail, those familiar with the art to which this invention relates will recognize various alternative designs and embodiments for practicing the invention within the scope of the appended claims.

What is claimed is:

1. An apparatus for positioning a plurality of sensors in contact with a plurality of locations, respectively, on a non-planar surface such that each sensor is positioned normal to the non-planar surface at the respective location on the surface, the apparatus comprising:

a movable fixture;

a plurality of pistons carried by said movable fixture, each of said plurality of pistons being independently movable with respect to the fixture, and each having a distal end; and a plurality of sensors pivotally connected, respectively, to the distal end of each said piston, wherein each of said distal ends is spring-biased away from the fixture, and wherein each said sensor includes at least two contact points for contacting the non-planar surface on opposing sides of the respective location for orienting the sensor in a position normal to the non-planar surface at the respective location;

wherein each said sensor comprises a cylindrical sensor head having a central opening therein for receiving a sensing member; and wherein each said sensor head is pivotally connected to the respective distal end by a ball and socket.

2. The apparatus of claim 1, wherein each said contact point is padded to prevent damage to the non-planar surface.

3. The apparatus of claim 1, wherein each said sensing member comprises a paint film thickness sensor.

4. The apparatus of claim 1, wherein each said cylindrical sensor head comprises a circular rim for contacting the non-planar surface, said circular rim being padded.

5. The apparatus of claim 1, wherein each said piston is linearly movable through a respective cylindrical aperture formed in the fixture.

6. The apparatus of claim 1, wherein said fixture is movably mounted on a pivotable support arm.

7. A method of positioning a plurality of sensors in contact with a plurality of locations, respectively, on a non-planar surface such that each sensor is positioned normal to the non-planar surface at the respective location on the surface for measuring paint thickness on the surface, the method comprising:

provided a movable fixture having a plurality of independently movable pistons thereon, each piston having a distal end with a sensor pivotally mounted thereto, wherein each distal end is spring-biased away from the fixture and each said sensor includes at least two cushioned contact points for contacting the non-planar surface on opposing sides of the respective location in a manner to prevent damage to the painted surface and for orienting the sensor in a position normal to the respective location;

moving the movable fixture toward the non-planar surface to engage one of said contact points of the respective sensor with the non-planar surface;

continuing said moving to pivot the respective sensor to said position normal to the respective location; and operating each said sensor to measure paint thickness at the plurality of locations.

8. The method of claim 7, further comprising moving the respective piston toward the fixture against the spring-bias to compensate for contour of said non-planar surface.

* * * * *